April 15, 1924.

J. B. FOOTE 1,490,374

VARIABLE SPEED TRANSMISSION GEARING FOR TRACTORS

Filed Aug. 17, 1917 — 5 Sheets-Sheet 3

Witness:
John Enders.

Inventor:
John B. Foote
by Fred Gerlach
his Atty.

April 15, 1924.  
J. B. FOOTE  
1,490,374  
VARIABLE SPEED TRANSMISSION GEARING FOR TRACTORS  
Filed Aug. 17, 1917  5 Sheets-Sheet 4

Witness:  
John Enders

Inventor:  
John B. Foote  
by Fred Gerlach  
his Atty.

Patented Apr. 15, 1924.

1,490,374

UNITED STATES PATENT OFFICE.

JOHN B. FOOTE, OF OAK PARK, ILLINOIS; JOHN T. KERWIN ADMINISTRATOR OF SAID JOHN B. FOOTE, DECEASED.

VARIABLE-SPEED TRANSMISSION GEARING FOR TRACTORS.

Application filed August 17, 1917. Serial No. 186,677.

*To all whom it may concern:*

Be it known that I, JOHN B. FOOTE, a citizen of the United States, and a resident of Oak Park, in the county of Cook and State of Illinois, have invented certain new and useful Improvements in Variable-Speed Transmission Gearing for Tractors, of which the following is a full, clear, and exact description.

The invention relates to variable speed transmission gearing for tractors.

One object of the invention is to provide improved driving mechanism which may be adapted for different tractors or to drive the traction wheels at different ratios relatively to the speed of the engine by simple gear changes that can be readily made in the field or on the road. In practice, it sometimes occurs that in pulling the plows or other loads the nature of the soil is such as to impose excessive burdens upon the engine and in these instances, aside from the speed variation permitted by the variable speed mechanism, it has been found desirable to vary the speed ratio between the engine and the variable speed machanism, so that the ratio of all of the speeds to the motor will be changed to specially adapt the tractor for the temporarily excessive load or particular work.

A further object of the invention is to provide improved variable speed driving mechanism which is constructed so that it can be readily applied to engines rotating in different directions by simple reversal of one of the bevelled gears.

A still further object of the invention is to provide improved variable speed mechanism which is simple in construction.

Other objects of the invention will appear from the following description.

The invention consists in the several novel features hereinafter set forth and more particularly defined by claims at the conclusion hereof.

Figure 1:
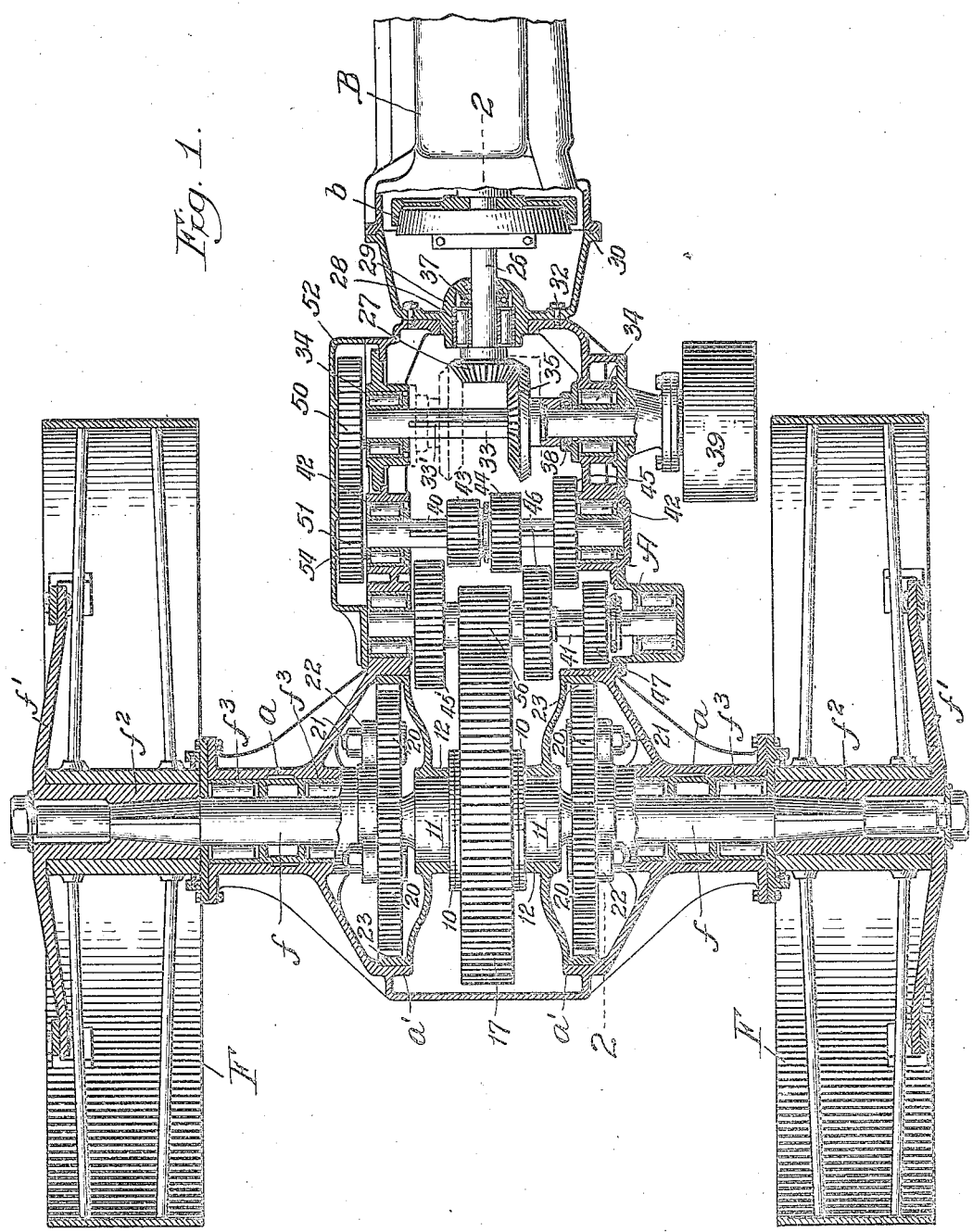
Figure 2:
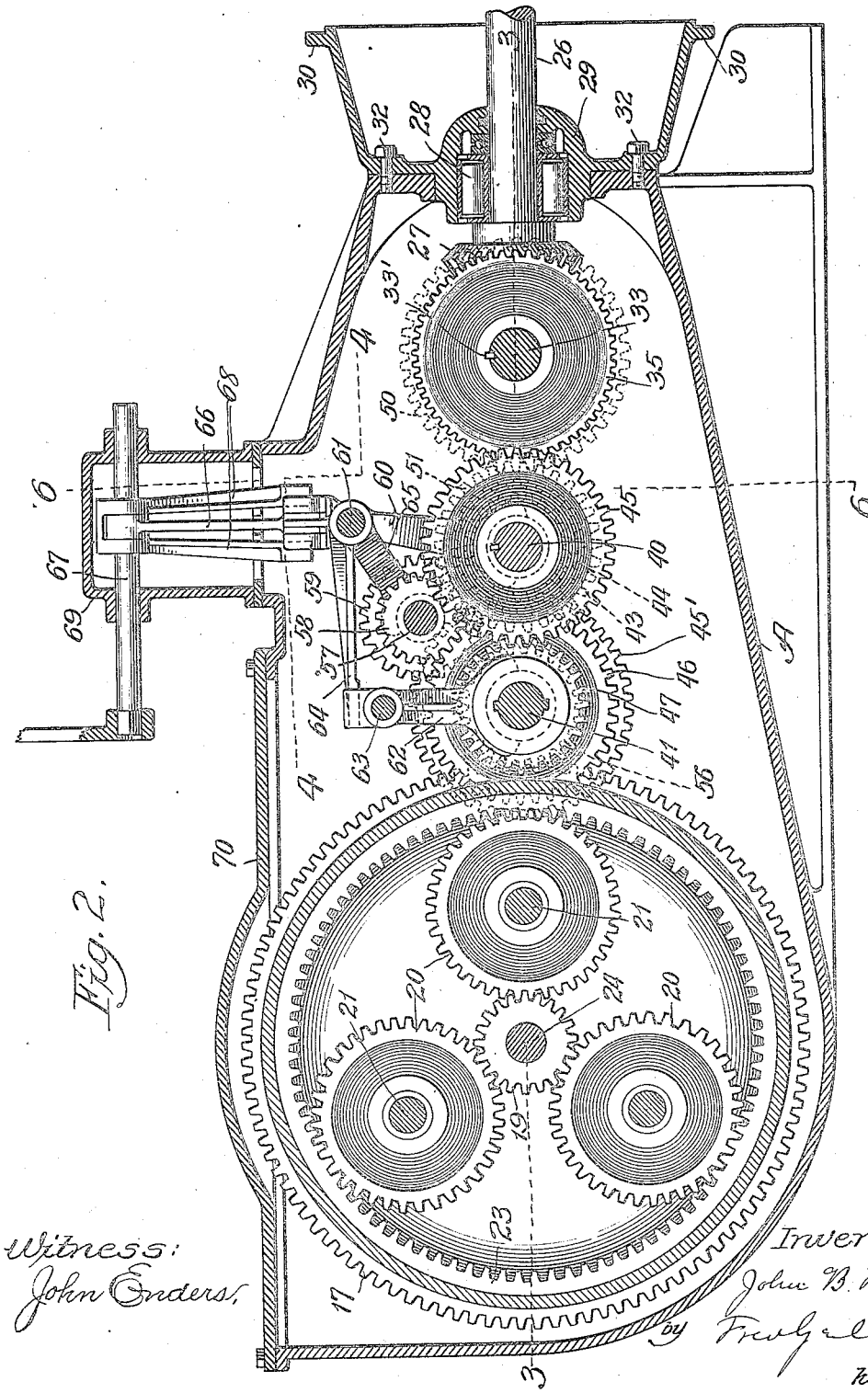
Figure 3:
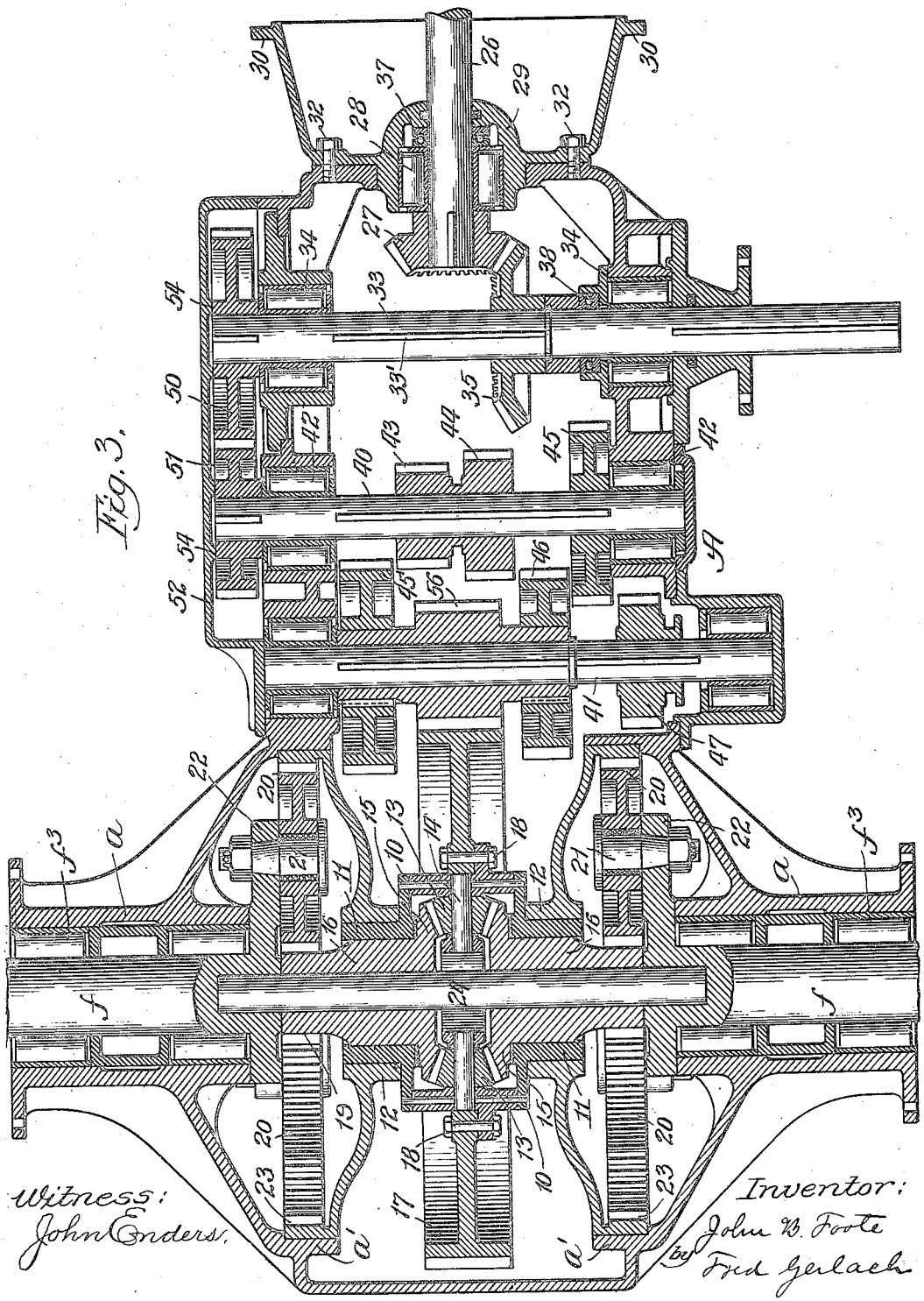
Figure 4:
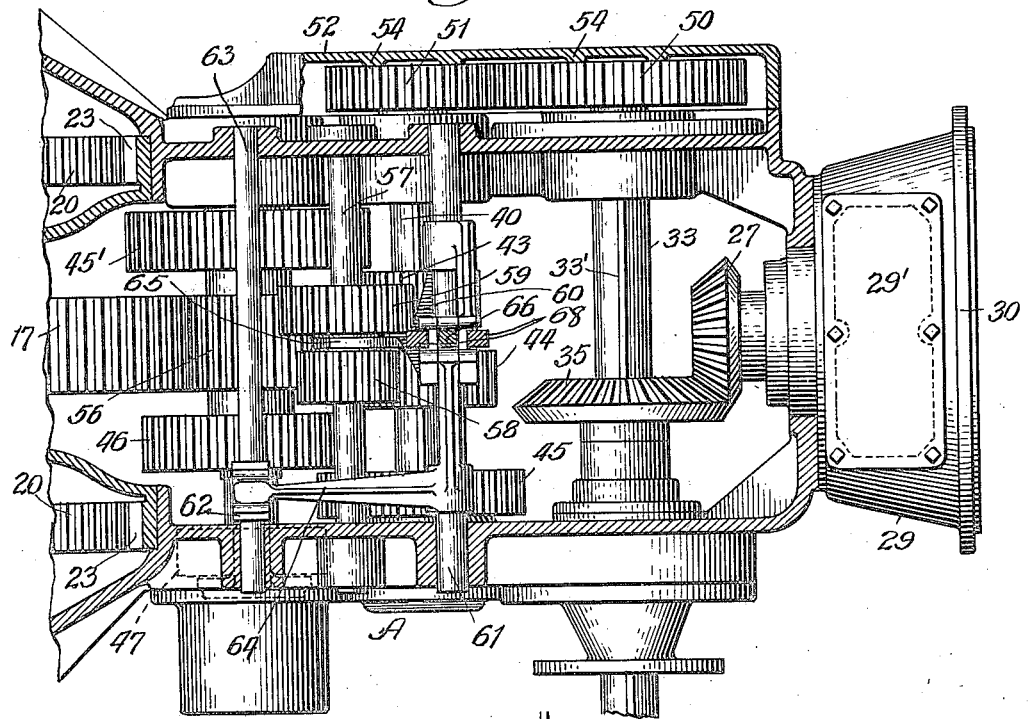
Figure 5:
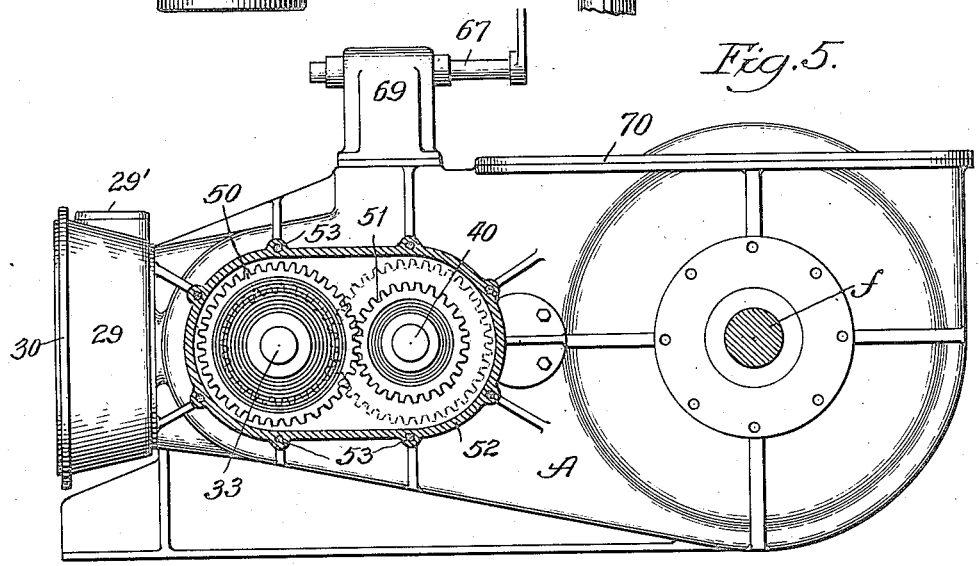
Figure 6:
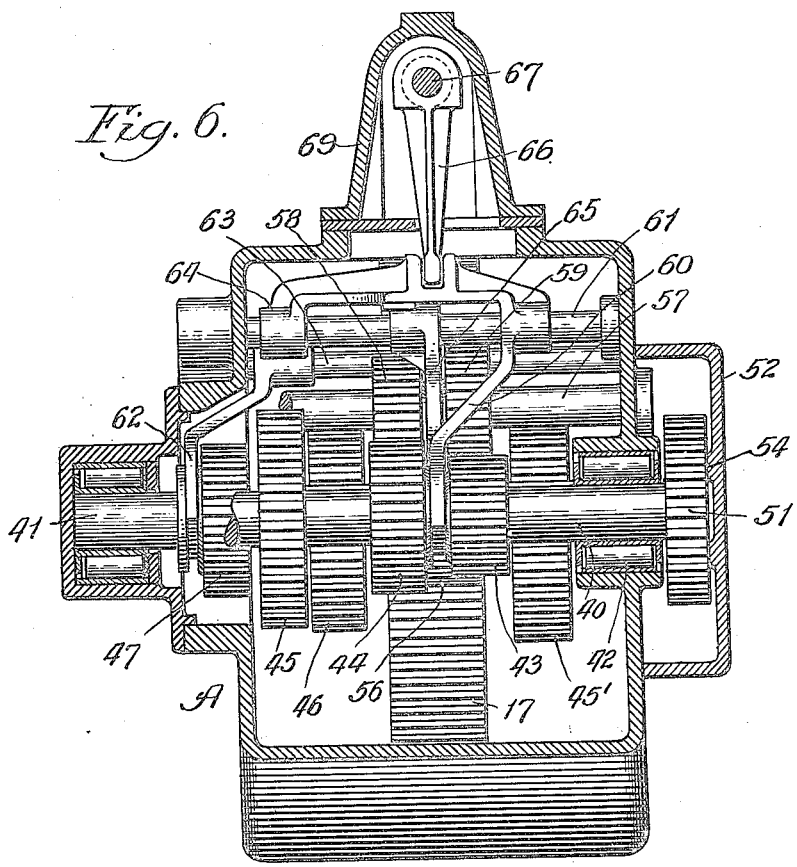
Figure 7:
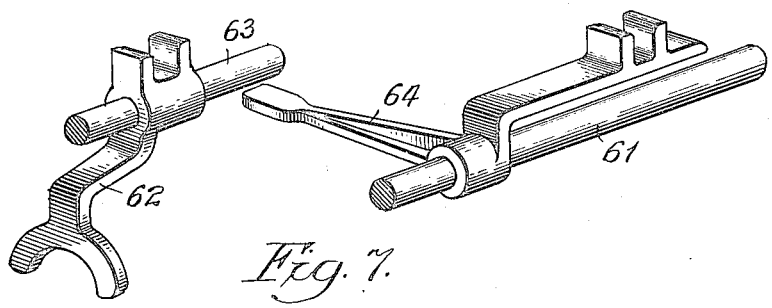

In the drawings: Fig. 1 is a plan, parts being shown in section, of a tractor embodying the invention. Fig. 2 is a vertical section taken on line 2—2 of Fig. 1. Fig. 3 is a horizontal section taken on line 3—3 of Fig. 2. Fig. 4 is a horizontal section taken on line 4—4 of Fig. 2. Fig. 5 is a side elevation of the gear-case, parts being shown in section. Fig. 6 is a section taken on line 6—6 of Fig. 2. Fig. 7 is a detail perspective of the devices for controlling the high-speed driving mechanism.

The variable speed and differential gearing is illustrated as applied to a pair of coaxial traction wheels F. Each traction-wheel is driven through one of a pair of coaxial axle-members $f$. Each axle member $f$ is supported in and connected to drive one of the traction-wheels by means of a spider $f'$ having a hub $f^2$ which is fixed to the end of the axle member and fits in the hub of the traction-wheel. Each axle-member $f$ passes through bearings $f^3$ in a sleeve $a$ formed on a case or housing A which encloses the variable speed and differential gearing.

The differential gearing through which the axle is driven comprises a drum 10 having hubs 11 which are journalled in bearings 12, planetary bevelled pinions 13 mounted on radial arbors 14 in the drum and bevelled gears 15 which mesh with the pinions 13 and operate pinions 19 to drive the axle members respectively through planetary reducing gearing. The hubs 16 of the gears 15 are mounted in the hubs 11 of the drum 10 and extend therethrough. A gear-ring 17 secured to the drum 10 by bolts 18, drives the differential from the variable speed and reversible gearing. Pinions 19 are integral with gears 15 respectively and each meshes with a series of planetary gears 20. These planetary gears 20 are mounted on studs 21 which are fixed in arms 22 integral with the inner ends of the axle-members $f$. The outer portions of each series of pinions 20 mesh with a stationary internally toothed gear 23 which is fixed in a flange $a'$ of the gear-case and is integrally formed with one of the bearings 12. A spindle 24 has its ends extended into sockets at the inner ends of axle members $f$ and extends through the hubs 16 which are integral with pinions 19 and gears 15. This spindle serves to hold the axle members and the differential gearing in true alignment. The mechanism described exemplifies planetary reducing gearing between the differential gearing and the axle members for driving the traction-wheels respectively.

The variable speed driving mechanism is adapted to be driven from a suitable motor B through a clutch $b$ which may be of any suitable or well known construction. The driven member of the clutch is connected to drive a longitudinal shaft 26, the rear end of which is provided with a bevelled pinion 27. Shaft 26 is mounted in a bearing 28 in a shell 29 or housing which is formed to serve as an intermediate supporting connection between the motor-casing and the gear-casing A. The front end of this shell 29 is flanged, as at 30, to abut against and for attachment to a corresponding flange on the casing of the motor B and bolts 32 secure the abutting front and rear faces of the case A and shell 29 together. A plate 29' is removably secured to the shell to provide access to the clutch. This shell exemplifies a structure whereby the front of the gear-case may be connected to and supported from the motor-casing. By changing the form or dimensions of this shell, it will lend itself for use as a connection for motors which are differently placed with respect to the front of the gear-case, thus adapting the mechanism for connection to differently placed motors by mere modification of the shell and without modification of the gear-case.

The transmission gearing comprises a transverse shaft 33 which is mounted in bearings 34 which are suitably sustained in the sides of the gear-case A. A bevelled gear 35 is mounted to rotate with shaft 33 and meshes with the drive-pinion 27 on the longitudinal shaft 26. A thrust bearing 37 is provided for the shaft 26 and a similar bearing 38 is provided for the shaft 33 to relieve these shafts of endwise stresses resulting from the bevelled gear-wheels. One end of the shaft 33 is extended to project outwardly from the case and is there provided with a service-pulley 39 which is adapted to drive a belt to operate any mechanism or implement other than the tractor itself. In practice, it is desirable to standardize the variable speed gearing so far as possible to adapt it for application to different tractors and motors. In some instances, the motors are driven in one direction and in other instances they are driven in the opposite direction and in order to adapt the variable speed gearing so that it can be driven in the correct direction by a motor operated in either direction, gear 35 and step-bearing 38 are reversible to the position indicated by dotted lines in Fig. 1. This reversal without any other change whatsoever makes it possible to utilize the variable speed gearing with a motor which drives in either direction. In attaining this result, the longitudinal shaft 26 is medially disposed between the bearings 34 so that the thrust bearing and gear 35 will operate at either side of the pinion 27, and a key 33' on shaft 33 is extended so as to drive gear 35 in either of its positions.

The variable-speed gearing includes a transverse countershaft 40 and a second transverse countershaft 41. Shaft 40 is mounted in bearings 42 which are supported in the sides of gear-case A. A low-speed pinion 43 and an intermediate-speed pinion 44 which are integral, are slidably mounted on shaft 40 and a high-speed gear 45 is fixed on said shaft. Pinions 43 and 44 are connected to shaft 40 so they will be rotated thereby and slidable thereon, to permit the low-speed pinion 43 to be shifted into engagement with a gear-wheel 45' on the second countershaft 41 and so that the intermediate-speed pinion 44 may be shifted in the opposite direction into engagement with a gear wheel 46 which is also mounted on the second countershaft 41. A gear-wheel 47 is slidably mounted on the second countershaft 41 so that it can be shifted into engagement with the high-speed gear 45 on the shaft 40. Shaft 41 is mounted in suitable bearings which are suitably supported by the walls of case A. Shaft 41 and gears 45' and 46 drive a pinion 56 which meshes with the gear 17 on the differential drum 10. For simplicity in manufacture, the hub of the pinion 56 is extended into and fixed in the hubs of gears 45' and 46 so that they may be conjointly placed on the shaft 41 in assembling the structure and so that when said shaft is withdrawn, pinion 56 and gears 45' and 46 will be held together.

The connection between the countershaft 40 and shaft 33 consists of a gear 50 which is removably connected to one end of the shaft 33 and a gear 51 which is removably connected to the adjacent end of the shaft 40. Gears 50 and 51 are disposed outwardly of the bearings for shafts 33 and 40 or on the outside of case A, so they can be removed without disturbing the shafts or the gearing in the case A, and a cover 52 is removably secured, by bolts 53, to one side of the case A to enclose these gears. Preferably, the cover is provided with surfaces 54 to hold the gears 50 and 51 on their respective shafts. The purpose of this changeable driving connection is to permit a ready change of speed ratio between the motor or the shaft 33 and the variable-speed gearing, so that the ratio may be quickly adapted for the particular work at hand. By removing the cover 52 and reversing the gears 50 and 51 on shafts 33 and 40, the speed ratio may be reduced or by the substitution of other gears may be further reduced or increased as may be desired. This construction exemplifies one by which the operator can, in the field, or on the road, effect a simple change to vary the speed ratio between the motor and the variable speed pinions for driving the load at all speeds.

A transverse shaft 57 (Figs. 2 and 4) is held in the side walls of the gear-case A and a pair of integral reverse-gears 58 and 59 are slidably mounted on said shaft. Gear 59 is adapted, when shifted from its normal position, to mesh with the intermediate speed pinion 44 and pinion 58 is adapted to mesh with the gear 46. This mechanism exemplifies reverse gearing between the intermediate speed pinion and the gear 46.

The controlling mechanism for the low and intermediate speed pinions comprises an arm 60 provided with a shifter-fork between said pinions and slidably mounted on a shaft 61. The high-speed controlling mechanism comprises a forked shifter-arm 62 engaging the hub of gear 47 and mounted on a rod 63 which is sustained in the gear case A and an arm 64 engaging and operating the arm 62 and slidably mounted on the shaft 61. The controlling mechanism for the reverse gearing comprises a fork shifter-arm 65 extended between pinions 58 and 59 and slidably mounted on the shaft 61. All of the controller-arms are provided with grooves which are normally aligned and into which the shifter arm 66 is adapted to pass to shift any of the arms transversely. Arm 66 is fixed to a controller-shaft 67 which is longitudinally movable so the arm can be shifted into engagement with any one of the shifter arms and can be rocked to shift any of the arms. Shaft 67 is mounted in a housing 69 which is mounted on the top of the gear-case A. The latter is provided with a removable plate 70 to provide access to the interior of the gear-case. Locking arms 68 are provided for the shifter arms which are not in use. The construction of these locking arms and arm 66 are more fully set forth in an application filed by me July 16, 1917, Serial No. 180,750 to which reference may be had for a more detailed explanation thereof.

In operation, shaft 26 will, under control of the clutch b, be driven from the engine. Whilst the clutch is operative, shaft 26 will drive gear 27 which will drive the gear-wheel 35, service shaft 33, gears 50 and 51 and the first countershaft 40. The intermediate, low and high speed pinions 43, 44 and 45 will be constantly driven. Any time that it should be desired to change the speed ratio between the engine and the variable speed driven pinions, it is only necessary to correspondingly vary, by reversal or substitution, the gears 50 and 51. When the tractor is to be driven at low speed, the operator will shift the controller arm 66 into position to engage the groove in the forked shifter arm 60 to the left, to bring pinion 43 into mesh with the gear 45'. Power will then be transmitted at low speed to the shaft 41, pinion 56 and gear 17 on the differential drum. When the tractor is to be operated at intermediate speed, the operator will manipulate the controller-arm 66 to shift the forked shifter-arm 60 to the right to bring pinion 44 into mesh with gear 46, whereupon shaft 41 and pinion 56 will be driven to operate the differential at intermediate speeds. When it is desired to drive the tractor at high speed, the operator will shift the controller arm 66 into position to shift arms 64 and 62 inwardly to bring pinion 47 into mesh with the gear 45 whereupon shaft 41 and pinion 56 will be driven at high speed to correspondingly drive the differential gearing. When the tractor is to be driven in reverse direction, controller arm 66 will be manipulated to move the shifter-arm 65, which extends between the reverse pinions 58 and 59, to the right so that gear 58 will mesh with the gear 46 and gear 59 will mesh with the intermediate-speed pinion 44, whereupon shaft 41 and pinion 56 will drive the differential gearing in reverse direction and at a low speed.

The invention exemplifies an improved variable speed driving mechanism for tractors in which provision is made for simple variation of the speed ratio between the motor and the shaft from which the variable speed and reverse pinions are driven which will affect the gearing for driving at all speeds. Also one in which planetary gearing of improved construction is utilized to drive the axle members of the traction-wheels at a reduced speed with respect to the differential gearing. Also a construction of gear-case which can be utilized in tractors in which the traction-wheels and motors are differently positioned, relatively by variation of the shell at the front of the gear-case. Also mechanism in which the proper direction of travel can be attained by reversal of a bevelled gear-wheel from motors driven in different directions.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In transmission gearing for tractors, the combination of a case, a service shaft mounted in the case, a longitudinal shaft, driven by the motor, gearing between said shafts, a first countershaft, gearing between the latter shaft and the service shaft, a second countershaft, high, low, intermediate and reverse gearing between the first and second countershafts, and gearing for driving a tractor from the second countershaft.

2. In variable speed transmission gearing for tractors, the combination of a case, transverse shafts mounted in the case, gearing for driving one of the shafts, slidable low and intermediate and fixed high speed pinions on said latter shaft, gears on the second shaft with which the low and intermediate speed pinions are adapted to mesh and a slidable high speed gear on the second shaft movable into engagement with the fixed high speed pinion on the first shaft, and gearing for driving the tractor from the second shaft.

3. In variable speed transmission gearing for tractors, the combination of a case, transverse shafts mounted in the case, gearing for driving one of the shafts, slidable low and intermediate and fixed high speed pinions on said latter shaft, gears on the second shaft with which the low and intermediate speed pinions are adapted to mesh and a slidable high speed gear on the second shaft movable into engagement with the fixed high speed pinion on the first shaft and gearing for driving the tractor from the second shaft, comprising a pinion on the second shaft connected to rotate with the low and intermediate gears thereon.

4. In variable speed transmission gearing for tractors, the combination of a case, transverse shafts mounted in the case, gearing for driving one of the shafts, low, intermediate and high speed pinions on said latter shaft, gears on the second shaft with which the low, intermediate and high speed pinions are adapted to mesh, gearing enclosed in the case for driving the tractor from the second shaft, and reverse gearing comprising pinions movable into engagement with the intermediate speed pinion and a gear on the shafts respectively.

5. In variable speed transmission gearing for tractors, the combination of a case, transverse shafts mounted in the case, gearing for driving one of the shafts, slidable low and intermediate and fixed high speed pinions on said latter shaft, fixed gears on the second shaft with which the low and intermediate speed pinions are adapted to mesh, a slidable high speed gear on the second shaft movable into engagement with the fixed high speed pinion on the first shaft, gearing for driving the tractor from the second shaft, and reverse gearing comprising pinions movable into engagement with the intermediate speed pinion and a gear on the shafts respectively.

6. In variable speed transmission gearing for tractors, the combination of a case, transverse shafts mounted in the case, gearing for driving one of the shafts, slidable low, and intermediate and fixed high speed pinions on said latter shaft, gears on the second shaft with which the low and intermediate speed pinions are adapted to mesh, a slidable high speed gear on the second shaft, gearing for driving the tractor from the second shaft including differential gearing, and reverse gearing comprising slidable integral pinions movable into engagement with the intermediate speed pinion and a gear on the shafts respectively.

JOHN B. FOOTE.